United States Patent Office 3,445,221
Patented May 20, 1969

3,445,221
PHENOXYTHIOACETIC ESTERS AS DESICCANTS
Erik K. Regel, Wuppertal-Cronenberg, Germany, assignor to Chemagro Corporation, New York, N.Y., a corporation of New York
No Drawing. Filed June 24, 1966, Ser. No. 560,094
Int. Cl. A01m 9/12, 5/00; C07c 153/07
U.S. Cl. 71—72                    18 Claims

ABSTRACT OF THE DISCLOSURE

There is provided a process of desiccating cotton by applying to the growing cotton plant an ester having the formula:

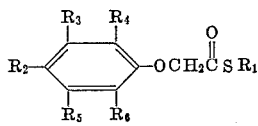

in an amount effective to cause desiccation, where $R_1$ is alkyl, alkenyl, phenyl, chlorophenyl, bromophenyl or benzyl; 1 to 3 of $R_2$, $R_3$ $R_4$, $R_5$ and $R_6$ are halogen of atomic weight 35 to 80, 0 to 1 of $R_2$, $R_3$, $R_4$, $R_5$ and $R_6$ is methyl and the balance of $R_2$, $R_3$, $R_4$, $R_5$, and $R_6$ are hydrogen.

The present invention relates to the desiccation of plants such as cotton.

Cotton plants are normally defoliated today in order to ease the work of cotton-picking machines. Unfortunately, however, some cotton varieties do not defoliate. Also in some locations, e.g., in Texas, the cotton plants do not defoliate well. In such instances, it is important to use a desiccant to freeze the leaves on the plant. Then the desiccated leaves are stripped prior to picking the cotton. Desiccation does not kill the roots of the plant but simply renders the leaves in a frozen condition.

It is an object of the present invention to develop novel desiccants for plants.

Another object is to develop novel defoliants for plants.

Still further objects and the entire scope of applicability of the present invention will become apparent from the detailed description given hereinafter; it should be understood, however, that the detailed description and specific examples, while indicating preferred embodiment of the invention, are given by way of illustration only, since various changes and modifications within the spirit and scope of the invention will become apparent to those skilled in the art from this detailed description.

It has now been found that these objects can be attained by desiccating (and in some instances defoliating) cotton with a compound having the formula:

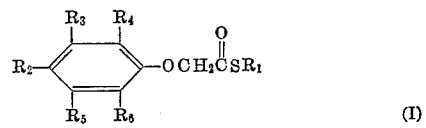

where $R_1$ is alkyl, alkenyl, aryl, haloaryl, or aralkyl, 1 to 3 of $R_2$, $R_3$, $R_4$, $R_5$ and $R_6$ are halogen of atomic weight 35 to 80, 0 to 1 of $R_2$, $R_3$, $R_4$, $R_5$ and $R_6$ is methyl and the balance of $R_2$, $R_3$, $R_4$, $R_5$ and $R_6$ are hydrogen. Most preferably, 2 of $R_2$, $R_3$, $R_4$, $R_5$ and $R_6$ are chloro. Next most preferably 1 of $R_2$, $R_3$, $R_4$, $R_5$ and $R_6$ is chloro and 1 of $R_2$, $R_3$, $R_4$, $R_5$ and $R_6$ is methyl.

$R_1$ is preferably lower alkyl or lower alkenyl.

The compounds of the present invention surprisingly combined high desiccation activity with low herbicidal activity. Furthermore, as can be seen by the results submitted infra in some instances, the compounds had excellent desiccation activity even when they were poor defoliants. In other cases the compounds proved to be good as both desiccants and defoliants.

Burgstrom et al. (Acta Agr. Scand., vol. 6, page 155 (1956), Chem. Abst. vol. 51, page 4630d) has reported on the plant growth activity of 2,4-dichlorophenoxythioacetic acid, 2,4,5-trichlorophenoxyacetic acid and 2-methyl-4-chlorophenoxythioacetic acid on linseed oil flax, wheat and peas. No tests were made with salts or esters nor was desiccation tested for.

Wieland et al. (Annalen vol. 591, page 192 (1955), Chem. Abst., vol. 50, page 2543h), disclose the S-phenyl ester and S-p-chlorophenoxy ester of 2,4,5-trichlorophenoxythioacetic acid as compounds.

British Patent 770,063 discloses the acids, salts and esters of 2,4-dichlorophenoxythioacetic acid, 2,4,5-trichlorophenoxythioacetic acid and 2-methyl-4-chlorophenoxythioacetic acid as herbicides but discloses no desiccant activity.

Belgian Patent 644,064 discloses α-(2-methyl-4-chlorophenoxy) thiopropionic acid-2,3,3-trichloroalkyl ester as an herbicide.

The dessiccants of the present invention can be made using the procedure of Wieland et al. or British Patent 770,063 but are preferably made by the following procedure:

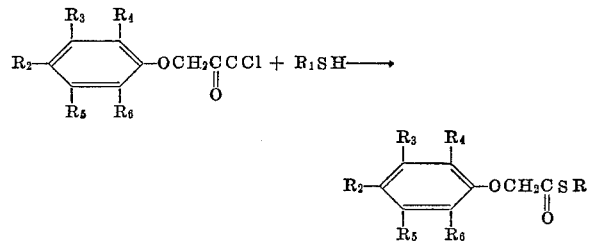

Examples of compounds within Formula I which can be used as desiccants according to the present invention are S-ethyl 2,4-dichlorophenoxythioacetate, S-butyl 2,4-dichlorophenoxythioacetate, S-methyl 2,4-dichlorophenoxythioacetate, S-propyl 2,4-dichlorophenoxythioacetate, S-isobutyl 2,4-dichlorophenoxythioacetate, S-sec. butyl 2,4-dichlorophenoxythioacetate, S-tert. butyl 2,4-dichlorophenoxythioacetate, S-sec. amyl 2,4-dichlorophenoxythioacetate, S-benzyl 2,4-dichlorophenoxythioacetate, S-allyl 2,4-dichlorophenoxythioacetate, S-crotyl 2,4-dichlorophenoxythioacetate, S-octadecenyl 2,4-dichlorophenoxythioacetate, S-amyl 2,4-dichlorophenoxythioacetate, S-dodecyl 2,4-dichlorophenoxythioacetate, S-octadecyl 2,4-dichlorophenoxythioacetate, S-p-chlorophenyl 2,4-dichlorophenoxythioacetate, S-phenyl 2,4-dichlorophenoxythioacetate.

Other examples are S-p-tolyl 2,4-dichlorophenoxythioacetate, S-o-bromophenyl 2,4-dichlorophenoxythioacetate, S-2',4'-dichlorophenyl 2,4-dichlorophenoxythioacetate, S-butyl 2,4-dibromophenoxythioacetate, S-ethyl 2,4-dibromophenoxythioacetate, S-methyl 2-methyl-4-chlorophenoxythioacetate, S-ethyl 2-methyl-4-chlorophenoxythioacetate, S-butyl 2-methyl-4-chlorophenoxythioacetate, S-sec. amyl 2-methyl-4-chlorophenoxythioacetate, S-allyl 2-methyl-4-chlorophenoxythioacetate, S-amyl 2-methyl-4-chlorophenoxythioacetate, S-dodecyl 2-methyl-4-chlorophenoxythioacetate, S-ethyl 4-chlorophenoxythioacetate, S-butyl 4-chlorophenoxythioacetate, S-methyl 4-chlorophenoxythioacetate, S-sec. amyl 4-chlorophenoxythioacetate, S-benzyl 4-chlorophenoxythioacetate, S-allyl 4-chlorophenoxythioacetate, S-amyl 4-chlorophenoxythioacetate, S-dodecyl 4-chlorophenoxythioacetate, S-ethyl 2,4,5-trichlorophenoxythioacetate, S-butyl 2,4,5-trichlorophenoxythioacetate, S-allyl 2,4,5-trichlorophenoxythioacetate, S-p-chlorophenyl 2,4,5-trichlorophenoxythioacetate, S- phenyl 2,4,5 - trichlorophenoxythioacetate, S-phenyl 2-methyl 4-chlorophenoxythioacetate, S-benzyl 2,4,5-trichlorophenoxythioacetate, S-butyl 2,4,5-tribromophenoxythioacetate, S-propyl 2 - methyl - 4 - bromophenoxythioacetate.

Unless otherwise indicated all parts and percentages are by weight.

Example 1

23.9 grams (0.1 mole) of 2,4-dichlorophenoxyacetyl chloride was placed in a 500 ml. three-necked flask, equipped with stirrer, thermometer and condenser. 100 ml. of benzene as a solvent was added and agitation was started. When the 2,4-dichlorophenoxyacetylchloride was dissolved there was added 9.5 grams (0.105 mole, a slight excess) of butyl mercaptan followed by 10.1 grams (0.1 mole) of triethylamine dissolved in 50 ml. of benzene. The temperature rose to 50° C. After stirring for approximately three hours, the reaction mixture was washed with water until the water washes were free of chloride ion and the benzene layer was then dried over anhydrous sodium sulfate and, after filtration, stripped of solvent. 28 grams of crude product was obtained. Further purification was done by vacuum distillation. There was obtained 23 grams (78.5% yield) of pure S-butyl 2,4-dichlorophenoxythioacetate, B.P.$_{0.01}$ 155° C., $n_D^{25}$ 1.5552, code No. 6620.

Example 2

The procedure of Example 1 was repeated, replacing the butyl mercaptan by 0.105 mole of methyl mercaptan. The product was S-methyl 2,4-dichlorophenoxythioactate, M.P. 104° C., code No. 6804.

Example 3

The procedure of Example 1 was repeated, replacing the butyl mercaptan by 0.105 mole of ethyl mercaptan. The product was S-ethyl 2,4-dichlorophenoxythioacetate, M.P. 50° C., code No. 6612.

Example 4

The procedure of Example 1 was repeated, replacing the butyl mercaptan by 0.105 mole of propyl mercaptan. The product was S-propyl 2,4-dichlorophenoxythioacetate, code No. 6955.

Example 5

The procedure of Example 1 was repeated, replacing the butyl mercaptan by 0.105 mole of 2-methylbutane-2-thiol

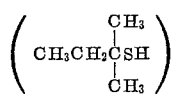

The product was S-sec. amyl 2,4-dichlorophenoxythioacetate, a red oil, code No. 6881.

Example 6

The procedure of Example 1 was repeated, replacing the butyl mercaptan by 0.105 mole of benzyl mercaptan. The product was S-benzyl 2,4-dichlorophenoxythioacetate, M.P. 73–74° C., code No. 6882.

Example 7

The procedure of Example 1 was repeated, replacing the butyl mercaptan by 0.105 mole of allyl mercaptan. The product was S-allyl 2,4-dichlorophenoxythioacetate, M.P. 30° C., code No. 6883.

Example 8

The procedure of Example 1 was repeated, replacing the butyl mercaptan by 0.105 mole of amyl mercaptan. The product was S-amyl 2,4-dichlorophenoxythioacetate, M.P. 32° C., code No. 6884.

Example 9

The procedure of Example 1 was repeated, replacing the butyl mercaptan by 0.105 mole of dodecyl mercaptan. The product was S-dodecyl 2,4-dichlorophenoxythioacetate, M.P. 39–40° C., code No. 6885.

Example 10

The procedure of Example 1 was repeated, replacing the butyl mercaptan by 0.105 mole of p-chlorothiophenol. The product was S-p-chlorophenyl 2,4-dichlorophenoxythioacetate, M.P. 72–74° C., code No. 6614.

Example 11

The procedure of Example 1 was repeated, replacing the 2,4-dichlorophenoxyacetyl chloride by 0.1 mole of 2-methyl-4-chlorophenoxyacetyl chloride and replacing the butyl mercaptan by 0.105 mole of methyl mercaptan. The product was S-methyl 2-methyl-4-chlorophenoxythioacetate, M.P. 68° C., code No. 6805.

Example 12

The procedure of Example 11 was repeated, replacing the methyl mercaptan by 0.105 mole of ethyl mercaptan. The product was S-ethyl 2-methyl-4-chlorophenoxythioacetate, M.P. 35–38° C., code No. 6613.

Example 13

The procedure of Example 11 was repeated, replacing the methyl mercaptan by 0.105 mole of butyl mercaptan. The product was S-butyl 2-methyl-4-chlorophenoxythioacetate, an oil $n_D^{25}$ 1.5420, code No. 6621.

Example 14

The procedure of Example 11 was repeated, replacing the methyl mercaptan by 0.105 mole of propyl mercaptan. The product was S-propyl 2-methyl-4-chlorophenoxythioacetate, code No. 6956.

Example 15

The procedure of Example 11 was repeated, replacing the methyl mercaptan by 2-methyl butane 2-thiol. The product was S-sec.-amyl 2-methyl-4-chlorophenoxythioacetate, a red oil, code No. 6886.

Example 16

The procedure of Example 11 was repeated, replacing the methyl mercaptan by benzyl mercaptan. The product was S-benzyl 2-methyl-4-chlorophenoxythioacetate, M.P. 50° C., code No. 6887.

Example 17

The procedure of Example 11 was repeated, replacing the methyl mercaptan by allyl mercaptan. The product was S-allyl 2-methyl-4-chlorophenoxythioacetate, a red oil, code No. 6888.

Example 18

The procedure of Example 11 was repeated, replacing the methyl mercaptan by amyl mercaptan. The product was S-amyl 2-methyl-4-chlorophenoxythioacetate, a yellow oil, code No. 6889.

Example 19

The procedure of Example 11 was repeated, replacing the methyl mercaptan by dodecyl mercaptan. The product was S-dodecyl 2-methyl-4-chlorophenoxythioacetate, M.P. 40–43° C., code No. 6890.

Example 20

The procedure of Example 1 was repeated, replacing the 2,4-dichlorophenoxyacetyl chloride by 0.1 mole of 4-chlorophenoxyacetyl chloride and replacing the butyl mercaptan by 0.105 mole of ethyl mercaptan. The product was S-ethyl 4-chlorophenoxythioacetate, an oil $n_D^{20}$ 1.5578, code No. 6624.

Example 21

The procedure of Example 20 was repeated, replacing the ethyl mercaptan by butyl mercaptan. The product was S-butyl 4-chlorophenoxythioacetate, an oil $n_D^{25}$ 1.5435, code No. 6622.

Example 22

The procedure of Example 20 was repeated, replacing the ethyl mercaptan by methyl mercaptan. The product was S-methyl 4-chlorophenoxythioacetate, M.P. 62° C., code No. 6803.

Example 23

The procedure of Example 20 was repeated, replacing the ethyl mercaptan by 2-methyl butane-2-thiol. The product was S-sec. amyl 4-chlorophenoxythioacetate, a yellow oil, code No. 6891.

Example 24

The procedure of Example 20 was repeated, replacing the ethyl mercaptan by benzyl mercaptan. The product was S-benzyl 4-chlorophenoxythioacetate, M.P. 66–68° C., code No. 6892.

Example 25

The procedure of Example 20 was repeated, replacing the ethyl mercaptan by allyl mercaptan. The product was S-allyl 4-chlorophenoxythioacetate, a yellow oil, code No. 6893.

Example 26

The procedure of Example 20 was repeated, replacing the ethyl mercaptan by amyl mercaptan. The product was S-amyl 4-chlorophenoxythioacetate, a yellow oil, code No. 6894.

Example 27

The procedure of Example 20 was repeated, replacing the ethyl mercaptan by dodecyl mercaptan. The product was S-dodecyl 4-chlorophenoxythioacetate, M.P. about 25° C., code No. 6895.

Example 28

The procedure of Example 1 was repeated, replacing the 2,4-dichlorophenoxyacetyl chloride by 0.1 mole of 2,4,5-trichlorophenoxyacetyl chloride and replacing the butyl mercaptan by 0.105 mole of ethyl mercaptan. The product was S-ethyl 2,4,5-trichlorophenoxythioacetate, M.P. 43–45° C., code No. 6923.

Example 29

The procedure of Example 28 was repeated, replacing the ethyl mercaptan by 0.105 mole of butyl mercaptan. The product was S-butyl 2,4,5-trichlorophenoxythioacetate, M.P. 51–53° C., code No. 6924.

Example 30

The procedure of Example 28 was repeated, replacing the ethyl mercaptan by 0.105 mole of allyl mercaptan. The product was S-allyl 2,4,5-trichlorophenoxythioacetate, M.P. 83–85° C., code No. 6925.

Example 31

The procedure of Example 28 was repeated, replacing the ethyl mercaptan by p-chlorothiophenol. The product was S-p-chlorophenyl 2,4,5-trichlorophenoxythioacetate, an oil $n_D^{25}$ 1.5345, code No. 6926.

The compositions of this invention consist of the active desiccant as described herein together with materials referred to in the art as adjuvants, diluents, carriers and the like. The thus diluted active ingredient is hereby rendered adaptable for application by means of jets, nozzles, spreaders, dusters, foggers, and similar devices used in the practice of the art. Typical adjuvants, carriers, and diluents are represented by water, kerosene, xylene, talc, pyrophyllite, and diatomaceous earths. With water as the diluent it is convenient to add wetting agents to effect good foliage coverage, such agents effective for this purpose are Triton X-100 (alkyl aryl polyether alcohol, made by condensing 1 mol of p-octylphenol with 10 mols of ethylene oxide), Tween 20 (polyoxyalkylene derivative of sorbitan monolaurate and glycerol sorbitan laurate). The emulsifying agents are generally employed in only very small concentrations, for example, in a quantity up to about 0.3% by weight based on the weight of the emulsion. However, higher concentrations may be used, as high as 5% by weight, provided that it does not exert an adverse affect on the plant preventing desiccation by causing phytotoxicity. When the active ingredient is formulated in oils such as mentioned above and also including heptane, heavy mineral oils, benzene and carbon tetrachloride, such formulations may be applied directly to the plant to be desiccated with the addition of wetting agents.

The desiccants of the present invention are effective when applied in the range between 0.25 and 10 pounds per acre. The concentration of the active ingredient in the formulations may vary over wide ranges depending upon the diluents and the mode of application. Suspensions containing as little of 0.1 percent by weight can be effectively employed as well as concentration as high as 5 percent, the criterion being effective coverage to the foliage.

In the following desiccation and defoliation tests 0.5 gram of the compound to be tested was diluted with acetone. The solutions were then further diluted with acetone to give the indicated rates of application of active ingredients in pounds per acre. The cotton plants were sprayed with the solution while the plants were in the flowering stage. 25 mls. of the appropriate dilution were sprayed on two plants in an area of five square feet. The number of leaves on the plants were recorded. Observations were again made seven days later.

Desiccation was recorded on a 0 to 10 scale in which 0 is no effect and 10 is complete disiccation. Defoliation was recorded as the percentage of the leaves which defoliated.

The results are recorded in Tables 1–4. The rates of application are in pounds/acre.

TABLE 1

$$Cl-\!\!\!\left\langle\!\!\!\bigcirc\!\!\!\right\rangle\!\!\!-O-CH_2\overset{O}{\underset{\|}{C}}SR$$

| Code No. | R | Desiccant activity | | | | Defoliant activity | | | |
|---|---|---|---|---|---|---|---|---|---|
| | | 8 | 4 | 2 | 1 | 8 | 4 | 2 | 1 |
| 6803 | CH₃ | 7 | | 4 | | 0 | | 0 | |
| 6624 | C₂H₅ | 3 | 4 | 2 | 1 | 51 | 46 | 51 | 0 |
| 6622 | C₄H₉ | 7 | 5 | 3 | 1 | 0 | | 0 | |
| 6894 | C₅H₁₁ | 8 | 4 | 3 | 1 | 30 | 15 | 27 | 12 |
| 6895 | C₁₂H₂₅ | 6 | | 3 | | 0 | | 0 | |
| 6891 | CH₃CH₂C(CH₃)(CH₃)— | 3 | | 2 | | 0 | | 0 | |
| 6893 | CH₂=CHCH₂— | 6 | | 5 | | 0 | | 0 | |
| 6892 | 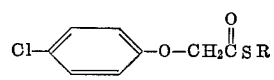 | 6 | | 2 | | 0 | | 0 | |

TABLE 2

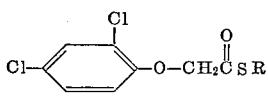

| Code No. | R | Desiccant activity | | | | Defoliant activity | | | |
|---|---|---|---|---|---|---|---|---|---|
| | | 8 | 4 | 2 | 1 | 8 | 4 | 2 | 1 |
| 6804 | CH₃ | 7 | 7 | 7 | 5 | 0 | ---- | 0 | ---- |
| 6612 | C₂H₅ | 9 | 8 | 8 | 7 | 0 | ---- | 0 | ---- |
| 6955 | C₃H₇ | 8 | 8 | 7 | 6 | 35 | 35 | 36 | 22 |
| 6620 | C₄H₉ | 9 | 8 | 7 | 7 | 0 | ---- | 0 | ---- |
| 6884 | C₅H₁₁ | 7 | 7 | 7 | 4 | 29 | 47 | 31 | 32 |
| 6885 | C₁₂H₂₅ | 3 | 4 | 2 | 2 | 30 | 9 | 39 | 34 |
| 6881 | CH₃CH₂C(CH₃)(CH₃) | 4 | 5 | 4 | 4 | 34 | 41 | 29 | 37 |
| 6883 | CH₂=CHCH₂— | 7 | 5 | 5 | 4 | 37 | 34 | 25 | 38 |
| 6882 | ⌬—CH₂— | 4 | 3 | 2 | 1 | 19 | 33 | 32 | 22 |
| 6614 | Cl—⌬— | 3 | 4 | 3 | 2 | 48 | 56 | 51 | 43 |

TABLE 3

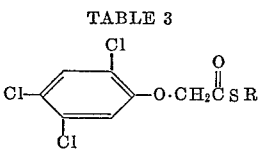

| Code No. | R | Desiccant activity | | | | Defoliant activity | | | |
|---|---|---|---|---|---|---|---|---|---|
| | | 8 | 4 | 2 | 1 | 8 | 4 | 2 | 1 |
| 6923 | C₂H₅ | 7 | 6 | 6 | 5 | 35 | 38 | 36 | 38 |
| 6924 | C₄H₉ | 4 | 3 | 4 | 1 | 56 | 19 | 65 | 41 |
| 6925 | CH₂=CHCH₂— | 6 | 7 | 4 | 2 | 49 | 51 | 48 | 26 |
| 6926 | Cl⌬— | 8 | 8 | 7 | 6 | 27 | 84 | 0 | 0 |

TABLE 4

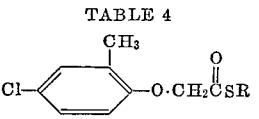

| Code No. | R | Desiccant activity | | | | Defoliant activity | | | |
|---|---|---|---|---|---|---|---|---|---|
| | | 8 | 4 | 2 | 1 | 8 | 4 | 2 | 1 |
| 6805 | CH₃ | 7 | 7 | 5 | 2 | 0 | ---- | 0 | ---- |
| 6613 | C₂H₅ | 8 | 9 | 6 | 4 | 0 | ---- | 0 | ---- |
| 6956 | C₃H₇ | 7 | 7 | 6 | 5 | 24 | 40 | 54 | 12 |
| 6621 | C₄H₉ | 8 | 8 | 7 | 7 | 0 | ---- | 0 | ---- |
| 6889 | C₅H₁₁ | 7 | 7 | 6 | 3 | 32 | 30 | 0 | 0 |
| 6890 | C₁₂H₂₅ | 3 | ---- | 3 | ---- | 0 | ---- | 0 | ---- |
| 6886 | CH₃CH₂C(CH₃)(CH₃) | 3 | 3 | 1 | 1 | 37 | 22 | 29 | 22 |
| 6888 | CH₂=CHCH₂— | 7 | 8 | 7 | 4 | 30 | 17 | 24 | 19 |
| 6887 | ⌬—CH₂— | 3 | 2 | 3 | 2 | 29 | 27 | 22 | 22 |

What is claimed is:

1. The method of desiccating cotton comprising applying to the growing cotton plant an ester having the formula:

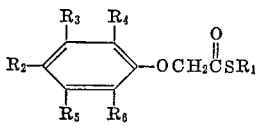

in an amount effective to cause desiccation, where R₁ is is alkyl, alkenyl, phenyl, chlorophenyl, bromophenyl or benzyl; 1 to 3 of R₂, R₃ R₅ and R₆ are halogen of atomic weight 35 to 80, 0 to 1 of R₂, R₃, R₅ and R₆ is methyl and the balance of R₂, R₃, R₄, R₅, and R₆ are hydrogen.

2. The method according to claim 1 wherein the ester has the formula:

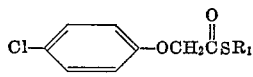

3. The method according to claim 2 wherein R₁ is lower alkyl.

4. The method according to claim 1 wherein the ester has the formula:

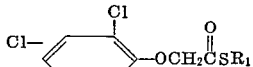

5. The method according to claim 4 wherein R₁ is lower alkyl.

6. The method according to claim 5 wherein R₁ is a normal alkyl group having 1 to 5 carbon atoms.

7. The method according to claim 6 wherein R₁ is ethyl.

8. The method according to claim 6 wherein R₁ is propyl.

9. The method according to claim 6 wherein R₁ is butyl.

10. The method of claim 6 wherein R₁ is methyl.

11. The method according to claim 4 wherein R₁ is allyl.

12. The method according to claim 1 wherein the ester has the formula:

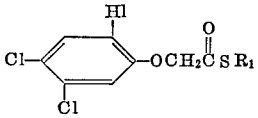

13. The method according to claim 12 wherein R₁ is lower alkyl.

14. The method according to claim 12 wherein R₁ is chlorophenyl.

15. The method according to claim 1 wherein the ester has the formula:

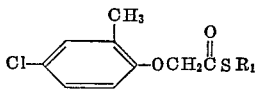

16. The method according to claim 15 wherein R₁ is lower alkyl.

17. The method according to claim 16 wherein R₁ is n-alkyl of 2 to 4 carbon atoms.

18. The method of claim 15 wherein R₁ is allyl.

References Cited

UNITED STATES PATENTS

| 2,580,653 | 1/1952 | Bridgeman | 71—116 |
| 2,668,103 | 2/1954 | Goodhue | 71—98 |
| 3,101,265 | 8/1963 | Smutny et al. | 71—69 |
| 3,377,372 | 4/1968 | Berezin et al. | 260—455 |

FOREIGN PATENTS

| 770,063 | 3/1957 | Great Britain. |

OTHER REFERENCES

Burstrom et al.: "The plant growth activity of phenoxythioacetic acids," CA 51, pp. 4630–31 (1957).

Thimann: "Use of 2,4-D Weed Killers on Woody Weeds in Cuba" (1947), Science, vol. 106, July 25, 1947, p. 87.

Wiberg: "Value of phenoxythioacetic acids in weed control" (1959), CA 54, p. 15809 (1960).

LEWIS GOTTS, *Primary Examiner.*

G. HOLLRAH, *Assistant Examiner.*

U.S. Cl. X.R.

71—100; 260—455